United States Patent [19]
Uy

[11] Patent Number: 5,531,354
[45] Date of Patent: Jul. 2, 1996

[54] SPATTER SHIELDING AND VAPOR VENTING DEVICE FOR FRYING PAN

[76] Inventor: William C. Uy, 621 Parkridge Dr., Hockessin, Del. 19707

[21] Appl. No.: 515,488

[22] Filed: Aug. 15, 1995

[51] Int. Cl.[6] .................................................. B65D 1/40
[52] U.S. Cl. .................. 220/731; 220/366.1; 220/369; 220/370; 99/645; 126/299 C; 366/347
[58] Field of Search ................................ 220/366.1, 369, 220/370, 731, 661, 662, 663, 676; 99/422, 423, 645; 126/299 C, 381, 390; 366/347

[56] References Cited

U.S. PATENT DOCUMENTS

| | | |
|---|---|---|
| D. 168,026 | 10/1952 | Fornoff . |
| 333,894 | 1/1886 | Simmons et al. . |
| 504,319 | 9/1893 | Bliven . |
| 534,138 | 2/1895 | Cleary . |
| 922,281 | 5/1909 | Hine ........................................ 220/370 |
| 1,722,513 | 7/1929 | Witter . |
| 1,807,271 | 5/1931 | Asadoorian ......................... 220/369 X |
| 1,843,918 | 2/1932 | Cornell .................................. 220/366.1 |
| 1,926,240 | 9/1933 | Maas ................................. 220/366.1 X |
| 2,198,158 | 4/1940 | Fletcher . |
| 2,350,243 | 5/1944 | MacKay . |
| 2,498,534 | 2/1950 | Drum . |
| 2,510,196 | 6/1950 | Willette . |
| 2,587,773 | 3/1952 | Sell et al. . |
| 2,614,718 | 10/1952 | Loop . |
| 2,629,511 | 2/1953 | Gosnell . |
| 2,680,532 | 6/1954 | Mitchell . |
| 2,867,352 | 1/1959 | Kawano . |
| 2,999,559 | 9/1961 | Boyer ................................. 220/369 X |
| 3,807,596 | 4/1974 | Baker . |
| 3,857,381 | 12/1974 | Kato ................................... 220/369 X |
| 3,999,680 | 12/1976 | Cho . |
| 4,000,830 | 1/1977 | French ................................... 220/369 |
| 4,108,332 | 8/1978 | Thompson . |
| 4,258,694 | 3/1981 | Kato . |
| 4,403,711 | 9/1983 | Kyosuke . |
| 4,700,689 | 10/1987 | Speker ............................... 220/369 X |
| 4,852,755 | 8/1989 | Michel et al. ...................... 220/731 X |

FOREIGN PATENT DOCUMENTS

| | | |
|---|---|---|
| 466473 | 7/1950 | Canada . |
| 25606 | of 1908 | United Kingdom . |
| 2124073 | 2/1984 | United Kingdom ..................... 99/645 |

*Primary Examiner*—Stephen K. Cronin

[57] ABSTRACT

A spatter shielding and vapor venting device for a frying pan comprising a transparent lid to enable visual observation of cooking, a peripheral venting gap to release generated fumes and vapors, a vertical hollow cylindrical wall to rapidly return condensed oil to frying pan, a handle to hold the device steady, a horizontal flange to facilitate placement on rims of frying pans of varying sizes, a vertical cylindrical flange to restrict lateral motion and to shield the contact area between the horizontal flange and frying pan rim, a vertical window opening for the introduction, removal, stirring and turning over of food, a hands-free opening and automatic closing window cover means to effectively shield the window opening even while performing said cooking operations.

7 Claims, 2 Drawing Sheets

SPATTER SHIELDING AND VAPOR VENTING DEVICE FOR FRYING PAN

REFERENCES

UNITED STATES PATENTS

| | | | |
|---|---|---|---|
| 168,026 | 10/1952 | Fornoff | 220/369 XR |
| 333,894 | 1/1886 | Simmons | 126/299 C |
| 504,319 | 9/1893 | Bliven | 220/369 XR |
| 534,138 | 2/1895 | Cleary | 220/369 XR |
| 1,722,513 | 7/1929 | Witter | 126/299 C |
| 1,807,271 | 5/1931 | Asadoorian | 126/299 C |
| 2,198,158 | 4/1940 | Fletcher | 126/299 C |
| 2,350,243 | 5/1944 | MacKay | 126/299 C |
| 2,498,534 | 2/1950 | Drum | 220/370 OR |
| 2,510,196 | 6/1950 | Willette | 220/369 OR |
| 2,587,773 | 3/1952 | Sell | 220/369 XR |
| 2,614,718 | 10/1952 | Loop | |
| 2,623,516 | 12/1952 | Salem | 126/299 C |
| 2,629,511 | 2/1953 | Gosnell | 126/299 C |
| 2,680,532 | 6/1954 | Mitchell | 126/299 C |
| 2,867,352 | 1/1959 | Kawano | 126/299 C |
| 3,082,566 | 3/1963 | Morano | 220/389 |
| 3,807,596 | 4/1974 | Baker | 220/369 OR |
| 3,857,381 | 12/1974 | Kato | 126/384 |
| 3,999,680 | 12/1976 | Cho | 220/369 |
| 4,108,332 | 8/1978 | Thompson | 220/369 |
| 4,258,694 | 3/1981 | Kato | 126/299 C |
| 4,266,527 | 5/1981 | Kato | 126/299 C |
| 4,403,711 | 9/1983 | Kyosuke | 126/299 C |

FOREIGN PATENTS

| | | | |
|---|---|---|---|
| 466,473 | 7/1950 | Canada | 220/24 R |
| 25,606 | 3/1908 | Great Britain | 220/24 R |

BACKGROUND OF THE INVENTION

1. Field of Invention

The present invention relates to a spatter shielding and vapor venting device for a frying pan, and more particularly to a device that is placed on the rim of a frying pan and covering the entire open surface area of the frying pan, said device being provided with a transparent lid for visual observation of the cooking process; a vertical hollow cylinder for rapid return of condensed oil into the frying pan; a handle attached to the said hollow cylindrical wall for holding steady the hot device; a peripheral horizontal flange for resting on the rim of a frying pan; a vertical cylindrical flange for preventing lateral motion and for shielding the contact area between the peripheral horizontal flange and the rim of a frying pan from spattering liquids; a vertical window opening in the vertical cylindrical wall for the introduction and removal of food or for the insertion of an instrument to stir or turn over food; a cover for the vertical window opening that provides maximum shielding through a hands-free opening and automatic closing mechanism for preventing the escape of spatters even during the performance of said cooking operations; and a peripheral venting gap between the lid and the top rim of the vertical cylindrical wall for discharging vapors generated during the frying process.

2. Prior Art

During a normal course of food frying process utilizing oil or fat, the contact of moisture containing food with the hot oil or fat produces extreme spattering of the liquids and food particles out of the frying pan to considerable distance, thereby not only messes up stove tops and surrounding surfaces but also creates an undue hazard to nearby people. The problems of grease fires in the kitchen as well as severe burns to people are well documented. In order to contain the spattering of hot liquids and solids and also to obviate a major safety hazard and messiness in the kitchen, the conventional means is to use a typical sauce pan cover. There are several problems with this sauce pan cover. First, most sauce pan covers are not transparent to enable the observation of the interior of the frying pan; second, there is no venting means to discharge the vapors generated during the frying process; third, the covers have to be removed to enable various cooking operations such as introduction, removal, stirring or turning over of food. Since the wall of a frying pan is very low and typically 1 to 2 inches, even a partial opening of the sauce pan cover exposes large unshielded peripheral opening through which spatters can escape. Therefore, there have been several methods mentioned in the prior art addressing these problems, the most challenging of which is preventing spatters from escaping out of the frying pan during performance of the various cooking operations.

For examples: a shielding screen cover that is flat or convex with a circular rim (U.S. Pat. Nos. 2,498,534; 3,807,596; 4,108,332); a conical cover made with circular tiers of vent slots (U.S. Pat. No. 534,138); a flat plate cover with a center hole for venting, over which is another flat plate (U.S. Pat. No. 2,510,196); a dome-shaped lid cover with venting holes on side and top (U.S. Pat. No. 2,867,352); hinged covers are described in the following U.S. Pat. Nos. 2,350,243; 2,587,773; 4,258,694; 4,403,711. However, while some of these methods provided for venting or the convenience of the covers being hinged and not needing a second hand to hold them opened, all of them provided shielding only if they are to remain in place and are not much more effective in preventing the escape of spatters as the typical sauce pan covers because they have to be removed or be held partially opened to perform any of those cooking operations of introduction, removal, stirring or turning over of food.

The following patents address the need for performing the cooking operations without having to remove the device by providing a window opening in the device: Canada Pat. No. 466,473; U.S. Pat. Nos. 333,894; 1,722,513; 168,026; 2,198,158; 2,629,511; 2,680,532; 3,999,680. However, because of the unshielded window opening, they provide only partial protection. Furthermore, the first three patents teach the method wherein the device houses the entire frying pan including the heat source. Because spattered and condensed hot oil and moisture do not drip back to the fry pan but to the bottom of the device and are in the vicinity of the heat source, there is the danger of starting a dangerous grease fire. Additionally, the hot oil fumes filling the inside of the device presents a very dangerous explosive fire hazard. This is specially so if the heat source is an open fire.

U.S. Pat. Nos. 1,807,271; 2,623,516; 3,082,566 further improve the above mentioned prior art by providing a protective cover for the window opening. Venting of gases is provided in the first patent by having vent holes and in the third patent venting is through screens. However, since these three methods also house the entire frying pan and the heat source, they suffer the same danger of oil dripping to the bottom of the device nearing the heat source and corresponding fire hazard. Although a trough is provided at the bottom of the device in the first patent to contain the condensed liquids, their close vicinity to the heat source and overflow potential present the same kind of fire danger as described in previous paragraph. Actually, the explosive fire hazard from trapped oil fumes is more serious with these methods than those devices in the preceding paragraph wherein the window opening has no cover so that there is less trapped oil fumes.

The following prior art attempt to eliminate all of the above deficiencies and is partially but more successful than most prior art in preventing the escape of spatters during the performance of those cooking operations; none of these devices house the heat source; all have also incorporated some means for venting of vapors: Great Britain Pat. No. 25,606; U.S. Pat. Nos. 504,319; 2,614,718; 3,857,381; 4,266,527. These provide a window opening and a protective window cover which can be opened to perform those cooking operations and is closed when not in use. However, all of the windows are at an incline toward the center of the frying pan and since a substantial portion of spattering is directed upward, the greater the incline or the smaller the angle the plane of the window made with the horizontal, the greater the amount of spattering is thrown outside the frying pan when the window cover is opened for the purpose of performing those cooking operations. Furthermore, the window cover has to be opened manually. Still furthermore, if the window cover is to be held partially open for providing partial shielding of the windows during the performance of those cooking functions, a second hand is needed to hold the window cover. This second hand and its arm are therefore brought into close proximity of the hot vapors and spatters shooting out of the partially opened window and are thereby being put into danger of getting burned. And still furthermore, with both hands so preoccupied, there are no hand left to steady the device for holding on to the body of the device specially during stirring of food. Without holding steady the device, the device can be accidentally lifted up from the frying pan by a turner used to perform those cooking operations and thereby creating undue hazards. The British Pat. No. 25,606 describes a truncated oblique conical hood with a hinged or removable cover over an inclined window. The plane of the window in U.S. Pat. No. 504,319 is horizontal and represents the worst case. Furthermore, in order to provide a sufficient and complete observation of the cooking process specially during the removal or stirring of the food, the window cover needs to be completely opened as there are no transparent portion provided in the first three patents. Additionally, the U.S. Pat. No. 2,614,718 provides a device that sits on the bottom of a frying pan and therefore does not completely cover the entire open area of the fry pan. In deep frying, the hot oil or fat is not completely contained within the cover and flows outside of the device and is unprotected. Furthermore, in the U.S. Pat. Nos. 3,857,381 and 4,266,527, a frying pan is an integral part of the art and the protective hood can not be used with any conventional frying pan.

In the present invention, all the above mentioned problems and deficiencies are successfully solved.

SUMMARY OF THE INVENTION

An object of the present invention is to prevent hot solids and liquids from being thrown out of a frying pan by providing a shielding device that covers the entire open surface area of a frying pan.

Another objective of the present invention is to facilitate visual observation of the cooking process by providing a transparent lid.

A further objective of the present invention is to facilitate rapid return of the condensed oil back into the frying pan by providing a vertical hollow cylindrical wall.

A still further objective of the present invention is to prevent accidental lifting up and detachment of the hot device from a frying pan by providing a handle for holding onto.

A still further objective of the present invention is to facilitate placement of the device on the rims of frying pans of varying sizes by providing for a peripheral horizontal flange of sufficient width on the bottom end of the vertical hollow cylindrical wall.

A still further objective of the present invention is to restrict lateral motion of the device and also to shield the peripheral contact area between the rim of the frying pan and the peripheral horizontal flange from oil splashes by providing a vertical cylindrical flange of appropriate height below the peripheral horizontal flange and is of appropriate diameter so that it is smaller than the inside diameter of a frying pan.

A still further objective of the present invention is to facilitate the cooking operations of introducing, removing, stirring, and turning over of food with maximum shielding of the window opening and without the need of a hand to open, close or hold partially open the window cover by providing a vertical window in the vertical hollow cylindrical wall and a hands-free opening and automatic closing window cover.

A still further objective of the present invention is to facilitate the release of vapors by providing a peripheral venting gap between the lid and the top rim of the vertical hollow cylinder and shielding the venting gap from spattering by a vertical cylindrical flange on the bottom of the lid; said vertical cylindrical flange also restricts lateral motion of the transparent lid.

DETAILED DESCRIPTION OF THE INVENTION

The spatter shielding and vapor venting device of the present invention is shown generally by the letter L for the lid, which sits on top of a vertical hollow cylinder W, which has a vertical window opening that is shielded by a cover C.

Figure 1:
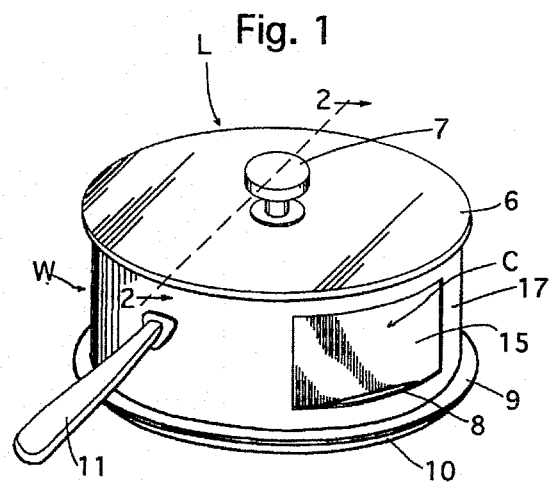
FIG. 1 is a perspective view of the present invention.
Figure 2:
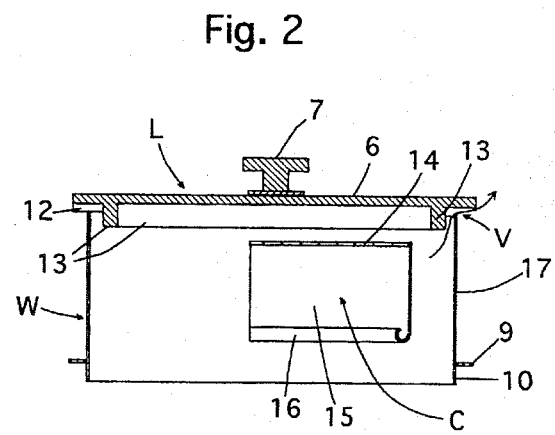
FIG. 2 is a vertical cross section taken along line 2—2 of FIG. 1 and view in the direction of the arrows.
Figure 3:
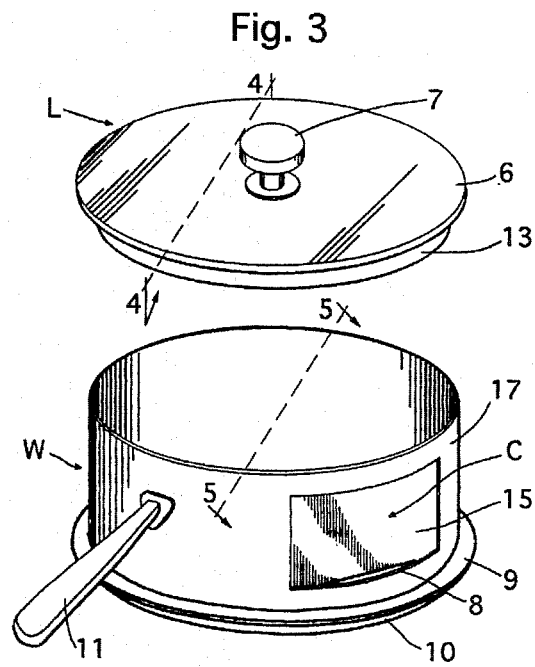
FIG. 3 is an exploded view of FIG. 1.
Figure 4:
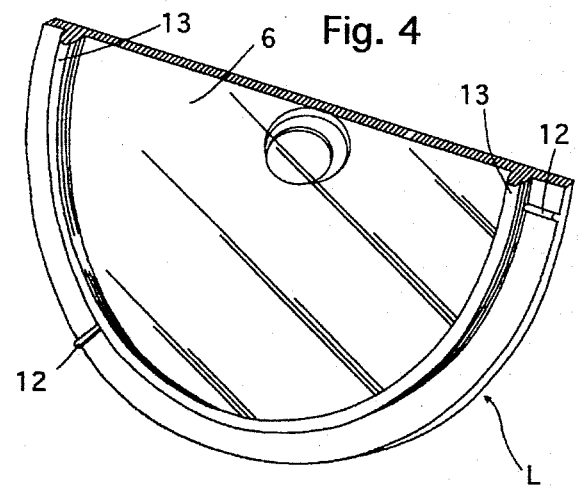
FIG. 4 is a vertical cross section taken along line 4—4 of FIG. 3 and view at an oblique angle the bottom of the lid in the direction of the arrows.

As shown in FIG. 1, the lid L has a knob 7 attached to a transparent circular lid plate 6, preferably made of glass, to facilitate visual inspection of the interior of vertical hollow cylinder W. The diameter of lid plate 6 is appropriately larger than the diameter of the vertical hollow cylinder W and the lid plate 6 rests on the top rim of said vertical hollow cylinder W on at least three radial ridges 12, as shown in FIGS. 2 and 4, forming a peripheral venting gap V between lid plate 6 and the top rim of said vertical hollow cylinder W. An alternate design for forming the peripheral venting gap V without the radial ridges 12 on lid plate 6 is to have at least three bumps on the rim of the vertical hollow cylinder W. The vertical cylindrical flange 13 on the bottom face of lid plate 6 shields the venting gap V from spatters and its height is taller than the radial ridges 12 to restrict lateral motion of the lid L. A curve vapor path way is shown by a curved arrow in FIG. 2.

A handle 11 is preferably attached to the wall 17 of the vertical hollow cylinder W to provide a means for holding the hot device steady during the performance of those cooking operations as in the introduction, removal, and specially during the stirring or turning over of food.

Located at the bottom end of the vertical hollow cylinder W are the peripheral horizontal flange 9, which with appropriate width can sits on the rim of frying pans of various sizes, and the vertical cylindrical flange 10, which prevents excessive lateral motion of the device and whose diameter is preferably smaller than the inside diameter of a frying pan so as to shield from spatters the contact area between the peripheral horizontal flange 9 and the rim of the frying pan. The peripheral horizontal flange 9, shown in its preferred location attached to the outer wall of the vertical hollow cylindrical wall 17, can also be attached to the inside wall of said hollow cylindrical wall 17.

Figure 5:
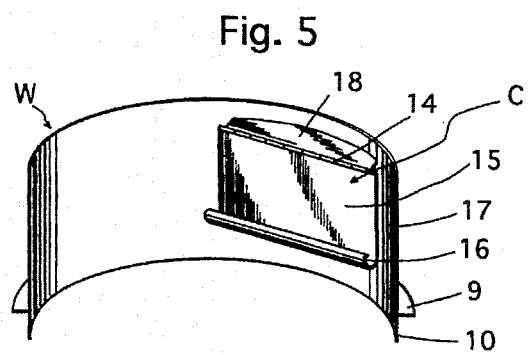
FIG. 5 is a vertical cross section taken along the line 5—5 of FIG. 3 and view at an oblique angle in the direction of the arrows.
Figure 6:
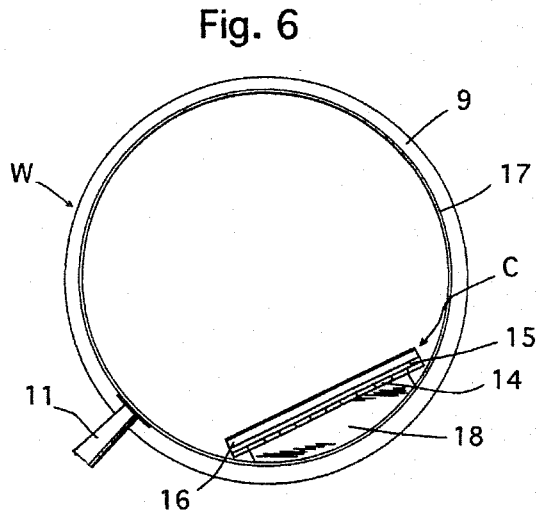
FIG. 6 is a top view of FIG. 1 without the lid.

A vertical window opening 8 in the vertical cylindrical wall 17 provides the means for performing those cooking operations. The vertical orientation of the curve plane of the window opening presents the least exposure to the spattering surface of the frying pan in comparison to those window openings of equal area inclined toward the inside of frying pan. The vertical window opening is shielded by a cover C consisting of a vertically hanged cover 15, whose hinged top edge 14 is attached to a horizontal member 18, as shown in FIG. 5, which is attached to the inside of the vertical wall 17 over the vertical window opening 8. The window cover 15, being hung vertically by gravity, is not restricted to swing freely about its hinged top edge 14 and can be pushed in to swing open with very little force by any instrument such as a turner or spatula without manually opening it. The said hanged cover 15 at its naturally gravity hanged position completely shields the window opening. Additionally, since the bottom edge of cover 15 always rests on the handle of an inserted instrument, the cover 15 is only partially opened as wide as needed depending on how far the instrument is inserted, thus exposing the bare minimum of the window opening. The window cover 15 will automatically open and close, without any spring mechanism, with the forward and backward movement of the inserted instrument and with very little friction between the instrument and cover 15 due to the complete weightlessness of the hanged cover. The simplicity of this design also means less things to go wrong or break down. The bottom edge of cover 15 is preferably curl as shown by bottom edge 16, as shown in FIGS. 2 and 5, so as to prevent catching the edges of an inserted sectional instrument. The instrument can be withdrawn from the covered window opening just as easily as it is inserted without the need of another hand to open the window cover. When the overall size of the said vertically hanged cover 15 is smaller than the window opening, the cover 15 can also swings open in the backward or out direction thus facilitating also a hands-free removal of food but at a minor sacrifice to the efficiency of shielding the window opening.

Accordingly, when the spatter shielding and vapor venting device of the present invention is mounted over a frying pan, food for frying can be loaded on top of an instrument, such as the blade of a turner, and introduced into the frying pan by gently pushing open the cover 15 with the front end of the instrument. Since the cover 15 is hanged and is practically weightless, the food on top of the instrument can be inserted deep inside the device without being scraped off from the instrument by the cover 15 and caused to be dropped onto the frying pan by rotating the instrument. Stirring can be commensurated using the instrument and since the cover 15 leans on the handle of the instrument, only the barest window opening is exposed to spatter at all times. The instrument can be moved with ease anywhere within the window opening. However, complete shielding protection against spatters escaping out is achieved by keeping the instrument close to the lower edge of the window opening. When the instrument is withdrawn, the cover 15 automatically swings closed. It is recommended that the handle is use to hold steady the device by the other hand during these cooking operations to prevent accidental lifting up of the device from the frying pan. The cooking process can be visually monitored through the transparent lid L. Meanwhile, oil fume and water vapor generated make their way out the peripheral venting gap V formed between the lid L and top rim of the hollow cylinder W.

Figure 7:
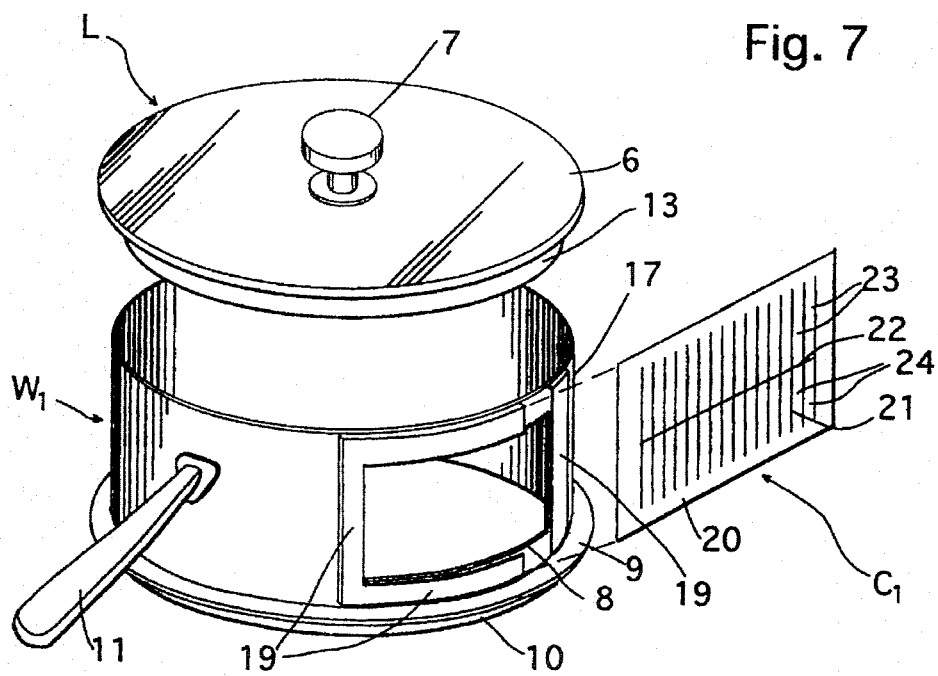
FIG. 7 is a perspective view showing another embodiment related to the present invention and showing the exploded view of the film strips window cover.

Furthermore, FIG. 7 shows another embodiment illustrating the hands-free opening and automatic closing cover $C_1$, which is composed of: a curtain of strips of material mounted around the window opening. The curtain is formed of fabric, plastic film or other suitable material. While a solid curtain of soft and drape-able material may provide shielding protection, it is not a preferred method because when an instrument is inserted and lifted up, the whole curtain is lifted up versus a selected few strips that are in contact with the instrument leaving the remaining strips still providing shielding protection. A preferred embodiment of the window cover $C_1$ is shown in FIG. 7 and comprises: a film 20 slitted at the indicated vertical lines 21 and horizontal line 22 resulting in fingers of vertical hanging strips 23 and vertical standing strips 24; a slotted flange 19 extending along the outside perimeter of the window opening 8 except for two breaks on the top and bottom as shown. The slotted flange 19 is attached at its outer most perimeter to wall 17. The film is preferably made of flame-proof plastic materials, such as polyimides and is sufficiently stiff for the vertical standing strips 24 to stay upright without bending. While the film can be slitted along other directions to form fingers of strips at other angles, the vertical strips are preferred as they provide a better shielding of the window opening since the vertical strips can follow the vertical curve plane of the window opening. With horizontally aligned strips, the stiff strips will stick out of the curve window plane at the attached end tangential to the circular cylindrical wall 17. The two sections vertical strips 23 and 24 described above in the preferred embodiment are more efficient than continuous vertical strips in providing shielding of the window opening specially when an inserted instrument is being moved about within the opening. For example, when continuous vertical strips are attached on top of the window opening and an instrument is inserted and raise all the way up, the area of exposed window opening will be equal to those vertical strips that were pushed out of the way. However, with the two sections vertical strips, only the top vertical strips 23 are pushed out of the way but the bottom vertical strips 24 are still in place, therefore the area of exposed window opening is 50% less. The bending resistance of the vertical strips can be made extremely low by using appropriately thin film thickness and narrow strip width. When in use, the slitted film 20 is inserted into the slotted flange 19 along the direction of the dotted lines and the right edge of slitted film 20 is tugged into the right side vertical slotted flange 19. The spatter shielding and vapor venting device is mounted on a frying pan. Food can be introduced into the frying pan by simply inserting the food laden instrument through the slitted film 20. The extremely low bending resistance of the slitted film 20 allows the food laden instrument to be inserted without the food being swept off the instrument and the food caused to be dropped onto the frying pan by rotating the instrument. Only those vertical strips touching the instrument and food will bend but they stay in contact at all times so that only the barest window opening is exposed. Once any film strip lost contact with the instrument or food it immediately and automatically returns to its original close position sealing the window opening. Stirring can be commensurated using the instrument and the instrument can be moved with practically no resistance anywhere within the window opening. However, complete shielding protection of the window opening from spatters escaping is around the vicinity of the horizontal center line 22. The instrument can be withdrawn just as easily hands-free and all the strips 23 and 24 of slitted film cover 20 will automatically return to their close positions. The movement area with complete shielding protection for an inserted instrument is increased by using at least two layers of slitted films with the film strips of the second layer covering the lines of cut of the first layer. This is accomplished by moving to either left or right the vertical lines of cut a distance equal to the half width of the individual film strip and the single horizontal line of cut can be moved either up or down an appropriate distance.

Decreasing the width and increasing the thickness of the individual film strips turn them into bristles. Thus, another embodiment illustrating the hands-free and automatic closing window cover is a dense layer of bristles pointing similarly as the film strips toward the center of the window opening.

Figure 8:
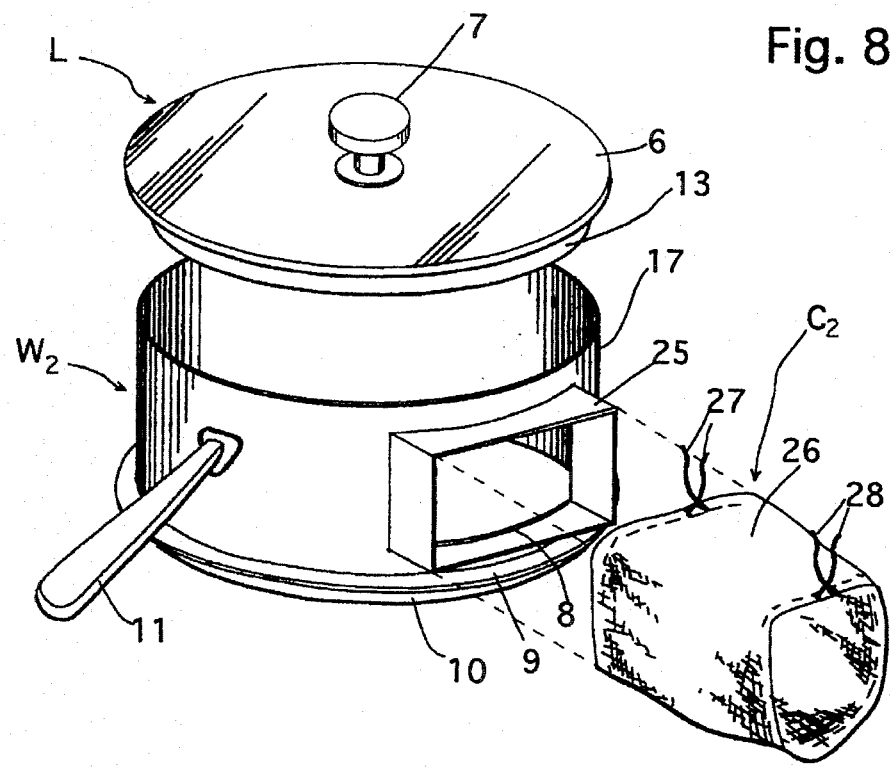
FIG. 8 is a perspective view showing another embodiment related to the present invention and showing the exploded view of the fabric sleeve window cover.

And still furthermore, FIG. 8 shows another embodiment illustrating the hands-free opening and automatic closing window cover $C_2$, which also facilitates complete movement of an instrument within the window opening and yet providing complete shielding protection against spatters from escaping out in any location within the window opening. The window cover $C_2$ is composed of: a fabric sleeve 26 with draw strings 27 at the front end and draw strings 28 at the rear end; a shroud 25 attached to the wall 17 around the perimeter of window opening 8. The fabric sleeve 26 and draw strings 27 and 28 are preferably made of non-flammable material such as glass fiber. Another embodiment of the draw strings 27 can be an elastic band to facilitate attachment to the shroud 25. The length of the fabric sleeve 26 is preferably equal to the width of the window opening plus the depth in which the fabric sleeve 26 is attached to the shroud so as to allow the instrument to move without physical restriction within the whole window opening. While FIG. 8 shows the embodiment of a pair of rear draw strings 28, they are not necessary if the length of the fabric sleeve 26 is of sufficient length such that with its top side of the sleeve draping down and the extension of the sleeve rear opening, the resulting rear opening of the fabric sleeve is no longer exposed to the spattering trajectories. The front perimeter edge of the shroud 25 preferably has some means of holding the fabric sleeve to prevent it from sliding off, for examples, a raise perimeter lip or hooks placed appropriately around the perimeter. When in use, the front end of fabric sleeve 26 is wrapped around shroud 25 and the draw strings 27 are drawn tight. The spatter shielding and vapor venting device is mounted onto a frying pan. Food is introduced with a food laden instrument inserted through the sleeve 26 rear opening. When the fabric sleeve 26 is of appropriate length, the top side of the sleeve is sufficiently draped down on and around the instrument so as to cover the window opening. The instrument can be moved with ease within the window opening and the stirring or turning over of food executed without any fear of spatters escaping out. Adding the rear draw strings 28, although not as preferred, assures total protection but at a sacrifice in ease of operation in requiring hands to tighten the draw strings and then loosening them in order to withdraw the inserted instrument.

What is claimed is:

1. A spatter shielding and vapor venting device for mounting on a frying pan and covering the entire open area of said frying pan, said device comprising;

a vertical hollow cylindrical wall having an open top with a top rim, a open bottom with a vertical bottom flange and a peripheral horizontal flange attached to and extending radially outwardly from said wall near the bottom flange, an opening in the wall spaced above the horizontal flange and forming a window through said wall, a window cover having an outer periphery the same shape as and substantially the same size as the opening to completely cover the opening, and a transparent lid covering the open top of said wall, said wall further having a handle attached to and extending radially outwardly from said wall, said handle being spaced from said opening, a horizontal plate attached to and extending radially inwardly from said wall and being located directly above said opening, said window cover further having a hinged top edge which is attached to said horizontal plate allowing said cover to swing to open and close said opening, said lid further having an outer perimeter, a bottom side, a cylindrical flange depending from said bottom side and spaced inwardly from the perimeter, and at least three radial ridges extending from said flange to the outer perimeter, said ridges engaging the top rim of the cylindrical wall when said lid is placed on said wall to space the bottom side of said lid from said rim to form a peripheral venting gap, whereby the shielding and venting device is placed onto the frying pan with the bottom and peripheral flanges of the cylindrical wall engaging the uppermost portion of the inner wall and the top wall of the pan respectively, the window cover allowing the insertion of a cooking utensil into the device to allow access to the pan interior without removal of the device from the pan and the peripheral venting gap allowing the pan to be vented without removal of the lid.

2. The shielding and venting device according to claim 1, wherein said window cover further has a curled bottom edge.

3. A spatter shielding and vapor venting device for mounting on a frying pan and covering the entire open area of said frying pan, said device comprising;

a vertical hollow cylindrical wall having an open top with a top rim, a open bottom with a vertical bottom flange and a peripheral horizontal flange attached to and extending radially outwardly from said wall near the bottom flange, an opening in the wall spaced above the horizontal flange and forming a window through said wall, a window cover having an outer periphery the same shape as and slightly bigger than the opening to completely cover the opening, and a transparent lid covering the open top of said wall, said wall further having a handle attached to and extending radially outwardly from said wall, said handle being spaced from said opening, a slotted flange attached to said wall and extending about an outer periphery of said opening, said slotted flange having two breaks located at a top and bottom of said opening, said outer periphery of said window cover being inserted into said slotted flange so that said outer periphery is engaged by said flange, said window cover being formed from a single piece of resilient material and having a plurality of vertically extending slits extending a length approximately equal to the distance between the top and bottom of the window opening and no wider than the width of said opening and having a single horizontal slit intersecting the vertical slits to form a plurality of resilient vertically extending strips, said lid further having an outer perimeter, a bottom side, a cylindrical flange depending from said bottom side and spaced inwardly from the perimeter, and at least three radial ridges extending from said flange to the outer perimeter, said ridges engaging the top rim of the cylindrical wall when said lid is placed on said wall to space the bottom side of said lid from said rim to form a peripheral venting gap, whereby the shielding and venting device is placed onto the frying pan with the bottom and peripheral flanges of the cylindrical wall engaging the uppermost portion of the inner wall and top wall of the pan, respectively, the window cover allowing the insertion of a cooking utensil into the device to allow access to the pan interior without removal of the device from the pan and the peripheral venting gap allowing the pan to be vented without removal of the lid.

4. The shielding and venting device according to claim 3, wherein said horizontal slit intersects said vertically extending slits at a midpoint of their length.

5. A spatter shielding and vapor venting device for mounting on a frying pan and covering the entire open area of said frying pan, said device comprising;

a vertical hollow cylindrical wall having an open top with a top rim, a open bottom with a vertical bottom flange and a peripheral horizontal flange attached to and extending radially outwardly from said wall near the bottom flange, an opening in the wall spaced above the horizontal flange and forming a window through said wall, a window cover having an outer periphery the same shape as and slightly bigger than the opening to completely cover the opening, and a transparent lid covering the open top of said wall, said wall further having a handle attached to and extending radially outwardly from said wall, said handle being spaced from said opening, a hollow shroud attached to and extending outwardly from an outer perimeter of said opening, said window cover surrounding said shroud and covering said opening, said window cover comprising an open ended fabric sleeve having, a means for attaching one end of said sleeve to said shroud, and a means for closing the other end of said sleeve, said lid further having an outer perimeter, a bottom side, a cylindrical flange depending from said bottom side and spaced inwardly from the perimeter, and at least three radial ridges extending from said flange to the outer perimeter, said ridges engaging the top rim of the cylindrical wall when said lid is placed on said wall to space the bottom side of said lid from said rim to form a peripheral venting gap, whereby the shielding and venting device is placed onto the frying pan with the bottom and peripheral flanges of the cylindrical wall engaging the uppermost portion of the inner wall and the top wall of the pan, respectively, the closed end of said window cover being openable, allowing the insertion of a cooking utensil into the device to allow access to the pan interior without removal of the device from the pan and the peripheral venting gap allowing the pan to be vented without removal of the lid.

6. The shielding and venting device according to claim 5, wherein said means for attaching and said means for closing comprises a pair of draw strings.

7. The shielding and venting device according to claim 5, wherein said means for attaching comprises an elastic band.

* * * * *